(12) United States Patent
      Pasula et al.

(10) Patent No.: US 12,585,374 B2
(45) Date of Patent: Mar. 24, 2026

(54) SYNCHRONISING USER ACTIONS TO ACCOUNT FOR DATA DELAY

(71) Applicant: Supercell Oy, Helsinki (FI)

(72) Inventors: Markus Pasula, Helsinki (FI); Jaakko Iisalo, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

(21) Appl. No.: 18/645,883

(22) Filed: Apr. 25, 2024

(65) Prior Publication Data

US 2024/0345708 A1      Oct. 17, 2024

Related U.S. Application Data

(63) Continuation of application No. 17/741,946, filed on May 11, 2022, now Pat. No. 12,001,655.

(51) Int. Cl.
     *G06F 3/0484*      (2022.01)
     *G06F 9/54*       (2006.01)
     *G06F 9/52*       (2006.01)

(52) U.S. Cl.
     CPC ............ *G06F 3/0484* (2013.01); *G06F 9/547* (2013.01); *G06F 9/52* (2013.01)

(58) Field of Classification Search
     None
     See application file for complete search history.

(56) References Cited

U.S. PATENT DOCUMENTS

| | | | |
|---|---|---|---|
| 5,734,909 A * | 3/1998 | Bennett ..................... | G06F 9/52 |
| | | | 710/200 |
| 2019/0321725 A1* | 10/2019 | Zimring ................ | A63F 13/323 |
| 2021/0052987 A1* | 2/2021 | Tian ..................... | A63F 13/358 |

* cited by examiner

*Primary Examiner* — Mandrita Brahmachari
(74) *Attorney, Agent, or Firm* — Ziegler IP Law Group, LLC.

(57)                ABSTRACT

Disclosed is an apparatus (100) comprising a display screen (104) and a processor (112). The processor is configured to generate and display a graphical user interface (102, 304) on the display screen, receive a user request (202) to execute a requested action (210) on the graphical user interface, send the user request to a server (204, 308), execute an intermediate action (206) on the graphical user interface, whilst waiting for the server to create and provide instructions pertaining to the user request, receive instructions (208) pertaining to the user request from the server, terminate execution of the intermediate action and execute the received instructions pertaining to the user request on the graphical user interface. Disclosed is also a system comprising a server communicably coupled to a plurality of apparatuses collaborating via respective graphical user interfaces.

20 Claims, 4 Drawing Sheets

SYNCHRONISING USER ACTIONS TO ACCOUNT FOR DATA DELAY

TECHNICAL FIELD

The present disclosure relates to an apparatus comprising a display screen and a processor. The present disclosure also relates to a system for synchronising actions, comprising a server communicably coupled to a plurality of apparatuses. The present disclosure also relates to a computer-implemented method for synchronising actions.

BACKGROUND

In recent years, the use of electronic devices, such as smartphones, tablets, laptops etc., has increased exponentially for day-to-day activities including, but not limited to, making calls, exchanging messages, browsing through internet, navigation, and media consumption. Nowadays, the electronic devices are also widely used for playing games (such as single-user or multi-user games), rendering and editing images or videos by one or more users using a common interface, simulations, and so on. Most of these electronic devices are incorporated with a touch-sensitive display screens and any application implemented thereon can be controlled through touch-sensitive operations on such display screens. An important aspect of any application implemented on the electronic device is the ease with which a user can interact with a user interface of the application to control various operations thereof.

In particular, for a better user experience, the application is intended to render the user interface seamlessly free from jitter, delay or lag. However, when a command is given to the application (such as a client-server-type application), the application interacts with the server, during the said interaction, and the user experiences jitter, delay or lag on her/his electronic device resulting from the network delay between the server and the electronic device as well as the processing time taken by the server and/or the electronic devices themselves to process the command. As a result, the command given by the user on the user interface does not start to execute immediately upon the initiation of the command, but at a further time which is a function of the said delay resulting from communication and processing. Indeed, the user might provide the same command several times leading to an increased number of commands, thereby further increasing unnecessary communication between the application and the server, and delays related thereto, hence resulting in a poor user experience.

Moreover, when two or more users control their respective user interfaces in the application, different users may face different lag problems, leading to a bad user experience when a relative action is performed by each user while intending to synchronize their actions. For example, a first user may execute a first action related to an object at a particular moment of time, while a second user may execute a second action to the same object at a later moment of time. However, due to different lags, before the first action is completed by the first user, the execution of the second action is made visible in the user interface for the second user. Consequently, the different delays can lead to a situation when those actions are in contradiction to each other and are not even possible. One of the available conventional techniques is to collect the commands from two or more users in the server and then provide instructions according to those commands to the processors of the electronic devices at the same time. However, the lags are still perceived on the electronic devices; as a result, the user interfaces of the electronic devices is not synchronised properly.

Therefore, in light of the foregoing discussion, there exists a need to overcome the aforementioned drawbacks associated with the conventional systems.

SUMMARY

The present disclosure seeks to provide an apparatus comprising a display screen and a processor. The present disclosure also seeks to provide a system for synchronising actions, comprising a server communicably coupled to a plurality of apparatuses. The present disclosure also seeks to provide a computer-implemented method for synchronising actions. An aim of the present disclosure is to provide a solution that overcomes at least partially the problems encountered in prior art.

In a first aspect, an embodiment of the present disclosure provides an apparatus comprising:
    a display screen; and
    a processor configured to:
        generate and display a graphical user interface on the display screen;
        receive a user request to execute a requested action on the graphical user interface;
        send the user request to a server;
        execute an intermediate action on the graphical user interface, whilst waiting for the server to create and provide instructions pertaining to the user request;
        receive the instructions pertaining to the user request from the server;
        terminate execution of the intermediate action; and
        execute the received instructions pertaining to the user request on the graphical user interface.

In a second aspect, an embodiment of the present disclosure provides a system comprising a server communicably coupled to a plurality of apparatuses according to the aforementioned first aspect, wherein the plurality of apparatuses are collaborating via respective graphical user interfaces, the server being configured to:
    receive, from the plurality of apparatuses, respective user requests to execute respective requested actions on the respective graphical user interfaces;
    collect a given set of user requests, from amongst the received user requests, that have been received during a given time interval;
    process the given set of user requests to create respective instructions pertaining to the user requests of the given set, wherein when processing the given set of user requests, the server is configured to determine, based on different network delays between the server and individual apparatuses, a time period within which the respective requested actions are to be executed, and wherein the respective instructions indicate to the individual apparatuses the determined time period within which the respective requested actions are to be executed; and
    send the respective instructions pertaining to the user requests of the given set to the plurality of apparatuses.

In a third aspect, an embodiment of the present disclosure provides a computer-implemented method comprising:
    generating and displaying a graphical user interface on a display screen of an apparatus;
    receiving a user request to execute a requested action on the graphical user interface;
    sending the user request to a server;

executing an intermediate action on the graphical user interface, whilst waiting for the server to create and provide instructions pertaining to the user request;

receiving the instructions pertaining to the user request from the server;

terminating execution of the intermediate action; and executing the received instructions pertaining to the user request on the graphical user interface.

In a fourth aspect, an embodiment of the present disclosure provides a computer program product comprising a non-transitory computer-readable storage medium having computer-readable instructions stored thereon, the computer-readable instructions being executable by a computing device comprising a processor to execute a method according to the aforementioned third aspect.

Embodiments of the present disclosure substantially eliminate or at least partially address the aforementioned problems in the prior art, and enable the graphical user interface to render on the apparatus such that a user does not experience any jitter or lag in execution of actions while interacting with the user interface of an application to control various operations thereof.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
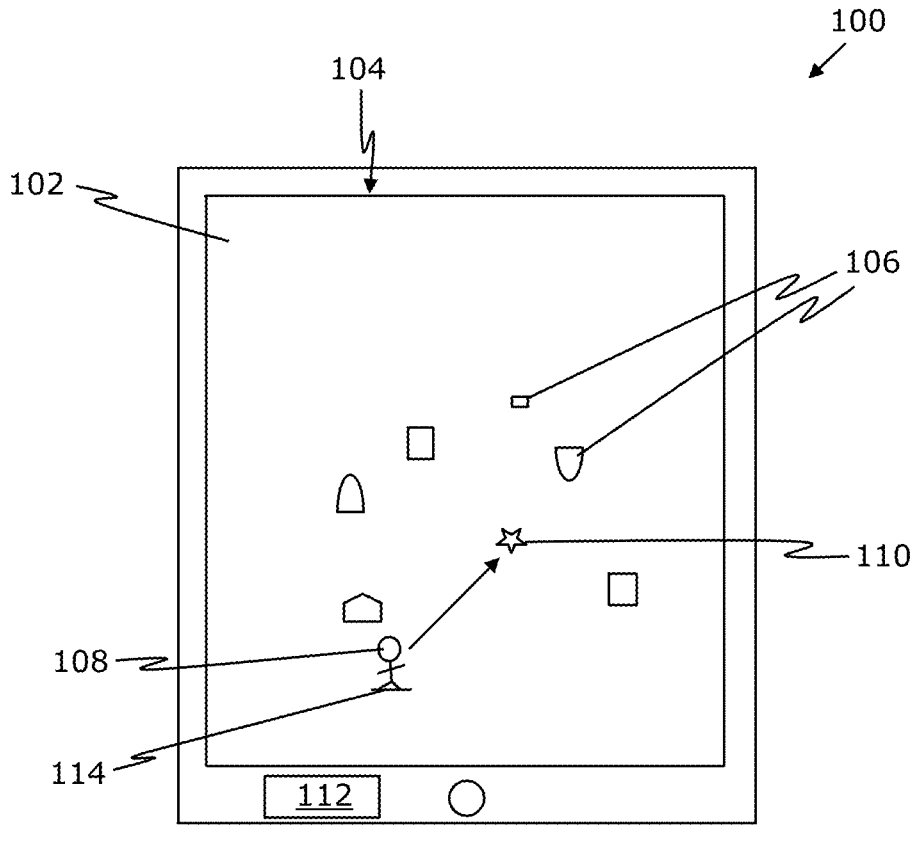
FIG. 1 is a schematic illustration of an apparatus for rendering a graphical user interface, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an apparatus comprising:

a display screen; and a processor configured to:

generate and display a graphical user interface on the display screen;

receive a user request to execute a requested action on the graphical user interface;

send the user request to a server;

execute an intermediate action on the graphical user interface, whilst waiting for the server to create and provide instructions pertaining to the user request;

receive the instructions pertaining to the user request from the server;

terminate execution of the intermediate action; and execute the received instructions pertaining to the user request on the graphical user interface.

In a second aspect, an embodiment of the present disclosure provides a system comprising a server communicably coupled to a plurality of apparatuses according to the aforementioned first aspect, wherein the plurality of apparatuses are collaborating via respective graphical user interfaces, the server being configured to:

receive, from the plurality of apparatuses, respective user requests to execute respective requested actions on the respective graphical user interfaces;

collect a given set of user requests, from amongst the received user requests, that have been received during a given time interval;

process the given set of user requests to create respective instructions pertaining to the user requests of the given set, wherein when processing the given set of user requests, the server is configured to determine, based on different network delays between the server and individual apparatuses, a time period within which the respective requested actions are to be executed, and wherein the respective instructions indicate to the individual apparatuses the determined time period within which the respective requested actions are to be executed; and send the respective instructions pertaining to the user requests of the given set to the plurality of apparatuses.

In a third aspect, an embodiment of the present disclosure provides a computer-implemented method comprising:

generating and displaying a graphical user interface on a display screen of an apparatus;

receiving a user request to execute a requested action on the graphical user interface;

sending the user request to a server;

executing an intermediate action on the graphical user interface, whilst waiting for the server to create and provide instructions pertaining to the user request;

receiving the instructions pertaining to the user request from the server;

terminating execution of the intermediate action; and executing the received instructions pertaining to the user request on the graphical user interface.

In a fourth aspect, an embodiment of the present disclosure provides a computer program product comprising a non-transitory computer-readable storage medium having computer-readable instructions stored thereon, the computer-readable instructions being executable by a computing device comprising a processor to execute a method according to the aforementioned third aspect.

The present disclosure provides the aforementioned apparatus, aforementioned system and aforementioned computer-implemented method. Embodiments of the present disclosure provide jitter and lag free graphical user interface to provide a better experience to the user. In this regard, the execution of the intermediate action on the graphical user interface is controlled locally, during the processing of the user request by the server. Beneficially, the intermediate action is provided on the graphical user interface, immediately after the user request is received, thereby acting as a feedback to the user that the user request is in progress. This provides better usability to the user. Moreover, the user requests received from the plurality of apparatuses during a given time interval are also processed in one go by the server, so as to avoid any contradicting actions to be performed. As the respective instructions indicate to the individual apparatuses the determined time period within which the respective requested actions are to be executed, the allowed requested actions are performed in a synchronised manner at the plurality of apparatuses. This enables the users to experience synchronized actions even when their apparatuses experience different network delays.

Throughout the present disclosure, the term "apparatus" as used herein refers to an electronic device associated with (namely, used by) a user, that is capable of enabling the user to perform specific tasks. The user may be any entity such as a person (i.e., a human being) or a virtual program (such as, an autonomous program or a bot) that is associated with or operates the apparatus. Notably, the apparatus is a user device. Examples of the apparatus may include, but are not limited to, a cellular phone, a personal digital assistant (PDA), a handheld device, a laptop computer, a personal computer, and so forth, configured to provide the graphical user interface on the display screen thereof. Beneficially, the interaction between the user and the apparatus allows an effective operation and control therebetween.

The term "graphical user interface" as used herein refers to a space where interaction between the user and the apparatus occurs. Typically, the graphical user interface presents one or more spatially distributed elements. It will be appreciated that the graphical user interface allows the user to manipulate elements presented on the display screen using a mouse, a stylus, or by a finger. Beneficially, the graphical user interface is designed to allow the user to interact easily, efficiently, and in a user-friendly manner with the apparatus to provide maximum usability thereof.

The term "display screen" as used herein refers to the screen of the apparatus. Typically, the display screen is configured to provide visual graphics of the graphical user interface to the user.

The term "processor" as used herein refers to a computational element that is operable to respond to and process instructions given by the user, and to control operations of the apparatus. Examples of the processor includes, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices.

The term "server" as used herein refers to a powerful physical or virtual infrastructure that has been virtualized, to perform application- and information-processing, storage and enable accessing of the stored information by users remotely over a data communication network. The server includes suitable logic, circuitry, interfaces, and/or code that is configured to store, process and/or receive the information from the apparatus corresponding to the requested action. Moreover, the server is configured to provide the real-time instructions based on the requested action. It will be appreciated that the server may be a cloud server. In addition, the server may be a single server or a plurality of servers operating in a parallel or distributed architecture to operatively couple with the disclosed apparatus or similar systems. Examples of the server include, but are not limited to, a storage server, a web server, an application server, or a combination thereof.

The term "user request" as used herein refers to a command provided by the user. Such a command may be provided via any suitable input, for example, such as a touch input (when the display screen is a touchscreen), a mouse click, or similar. The user request comprises information corresponding to a requested action to be performed on the graphical user interface. Moreover, the command may for example be provided as a word, a phrase or a sentence to cause a change in the graphical user interface, or the like. For example, the user request may be provided by a tap on the touchscreen to move to a target location.

Optionally, the user request is timestamped. Notably, the time when the user request is received from the user is recorded at the apparatus. In this regard, the server has the information about the time at which the user created the user request. Moreover, the timestamping of the user request enables the processor to identify the time to initiate the intermediate action, as well as optionally the time from which to calculate the time period within which the requested action is to be executed upon receiving the instructions from the server. For example, the server may receive, with the user request, a timestamp of the time (t0) at which the user request was received at the apparatus. After processing the user request, the server can provide a time period within which the user request is to be executed, wherein the time period begins at the time (t0). As the timestamp of the time (t0) is available to the server, the server can alternatively provide an end time (t2) by when the time period ends. Thus, the instructions can indicate the time period, by providing the time period or the end time of the time period. Beneficially, timestamping also eliminates the problem of variable delays in the apparatus, as it allows the server to collect user requests received over a given time interval.

The term "intermediate action" as used herein refers to the action occurring in between the time at which the user request is received and the time at which the instructions are received from the server or are processed by the processor to execute the requested action on the graphical user interface. Typically, the intermediate action is executed soon after the user request is received. Additionally, the intermediate action provides an illusion of an action being performed in the graphical user interface even when there are network and/or processing delays. As a result, the user is saved from unnecessarily repeatedly sending the user request multiple times, as the user can see the intermediate action taking place immediately after providing the user request. Moreover, during the execution of the intermediate action, the server processes the user request for the requested action and generates the instructions that is to be provided to the processor. Furthermore, the termination of the intermediate action occurs, when the processor processes or executes the instructions received from the server corresponding to the requested action, on the graphical user interface. When the server determines that the requested action is allowable, the received instructions from the server lead to executing the requested action on the graphical user interface. Otherwise, when the server determines that the requested action is not allowable, executing the received instructions from the server may cause: undoing the intermediate action (for example, in a case where the intermediate action was to slowly move the user-controllable object towards the target location and by the time the instructions from the server were received, the user-controllable object was already midway towards the target), and/or indicating to the user that the requested action is not possible. Optionally, the time difference between receiving the user request and executing the intermediate action is less than a predefined time duration. The predefined time duration may, for example, be 0.5, 0.4, 0.3, 0.2, 0.1 or 0.01 sec. This ensures that the intermediate action takes place before the user notices any delay.

Optionally, the requested action comprises relocating at least one user-controllable object from a given location to a target location on the graphical user interface, and the intermediate action comprises at least one of:
    presenting a visual indicator on the graphical user interface to indicate that relocation of the at least one user-controllable object is under progress,
    showing movement of the at least one user-controllable object from the given location towards the target location on the graphical user interface.

In this regard, it will be appreciated that the requested action comprises an instruction for relocating the at least one user-controllable object from the given location to the target location on the graphical user interface. The given location is the location at which the user-controlled object is located at the time of receiving the user request. Notably, the given location is the starting point and the target location is the final point of the user-controlled object.

Herein, the term "user-controllable object" as used herein refers to a symbol presented on the graphical user interface that can be controlled by the user. The symbol may, for example, represent a character. As an example, the user-controllable object may be a visual (or graphical) representation of a character generated by an application that is controlled by the user. In this regard, the user-controllable object indicates a real-time location and movement of the character on the graphical user interface (for example, in real-time games, navigation, simulators, and the like). Optionally, the user-controllable object may have geographic co-ordinates associated with it. Additionally, the user-controllable object also enables the user to locate other users such as in a multiplayer video game. Optionally, the user-controllable object may be a pointer, an avatar, or an animated character.

Herein, the intermediate action comprises providing the visual indicator on the graphical user interface to indicate, to the user, the relocation of the at least one user-controllable object is under progress. Optionally, the visual indicator may be a text, a symbol, or an image. For example, the visual indicator may be an arrow that drops from an upper part of the graphical user interface towards the target location.

Optionally, the intermediate action comprises showing the movement of the at least one user-controllable object from the given location towards the target location on the graphical user interface.

Optionally, the processor is configured to:
    determine a speed at which the at least one user-controllable object is to be moved, based on a distance between the given location and the target location and optionally, at least one of: a network delay between the apparatus and the server, a processing delay at the server, a processing delay at the apparatus; and
    when executing the intermediate action, move the at least one user-controllable object from the given location towards the target location at the determined speed.

It will be appreciated that the processor is configured to determine the distance between the given location and the target location. Based on the determined distance, the processor calculates the suitable speed of the at least one user-controllable object to move. Furthermore, the processor determines the network delay between the apparatus and the server and/or the processing delay between the server and the apparatus. Notably, the network delay arises due to the latency of data to travel across the data communication network between the apparatus and the server. Optionally, the network delay may be an average delay. Moreover, the processing delay arises due to the time taken by the server and/or the processor of the apparatus to process the user request and the received instructions, respectively.

Optionally, the received instructions indicate a time period within which the at least one user-controllable object is to reach the target location, wherein the time period begins from start time (t0) at which the user request was received by the processor, and wherein the processor is configured to:
    adjust the speed based on the time period within which the at least one user-controllable object is to reach the target location and a distance between the target location and a current location of the at least one user-controllable object on the graphical user interface; and
    when executing the received instructions, move the at least one user-controllable object towards the target location at the adjusted speed.

In this regard, the time period is the time taken by the user-controllable object to reach the target location from the given location. Herein the processor is configured to increase or decrease the speed of the user-controllable object based on the time period and the remaining distance between the target location and the current location.

For illustration purposes, there will now be considered an example. At time t0 the user request is provided to move the user-controllable object on a graphical user interface from a first location (such as the given location) to a second location (such as the target location), from co-ordinates (first location 100, 200) to co-ordinates (second location 300, 800), wherein the numbers refer to the number of pixels from the top left corner of the graphical user interface in X and Y direction, respectively. The execution of the intermediate action may start at time t1 indicating moving the user-controllable object towards the second location with a first speed. At time t2, the server receives the user request and begins to process the user request. After the user request is processed at the server, the instructions are delivered from the server to the apparatus at time t3. These instructions could indicate to the processor to complete the user request by time t4. Notably, the time period within which the requested action is to be performed is the time taken from the t0 to t4. At the apparatus, the execution of the intermediate action is terminated when the instructions are received or processed. The instructions are then executed by time t4. In addition, if while using the first speed the user-controllable object cannot reach the target location within the time period, the speed can be increased. Alternatively, if the user-controllable object may reach the target location earlier, then the speed of the user-controllable object can be decreased.

Optionally, the intermediate action comprises only presenting the visual indicator on the graphical user interface, and the received instructions indicate a time period within which the at least one user-controllable object is to reach the target location, wherein the time period begins from start time (t0) at which the user request was received by the processor, wherein the processor is configured to:

determine a speed at which the at least one user-controllable object is to be moved, based on a distance between the given location and the target location and the time period within which the at least one user-controllable object is to reach the target location; and when executing the received instructions, move the at least one user-controllable object from the given location towards the target location at the determined speed.

The visual indicator is beneficially timed to be presented for a time period that is not shorter than the delay of communicating the requested action to the server. It will be appreciated that the processor is configured to determine the distance between the given location and the target location and based on the determined distance and the time period indicated in the received instructions, the processor controls the speed of the user-controllable object.

Optionally, the processor is configured to determine a time period for which the intermediate action is to be executed, based on at least one of: a network delay between the apparatus and the server, a processing delay at the server, a processing delay at the apparatus, wherein the execution of the intermediate action is terminated after completion of the determined time period. The term "time period" as used herein refers to the time duration for which the intermediate action is to be executed. Herein, the time period for which the intermediate action is to be executed is smaller than the time period within which the at least one user-controllable object is to reach the target location. Beneficially, the time period enables the processor to execute the intermediate action such that the user does not experience any jitter or lag in the graphical user interface.

Optionally, the execution of the intermediate action is terminated upon at least one of:

receipt of the instructions pertaining to the user request, processing of the instructions pertaining to the user request, said processing being performed prior to execution of the instructions.

It will be appreciated that beneficially the termination of the intermediate action is performed before the received instructions are executed, so that the intermediate action and the requested action are not performed simultaneously.

The present disclosure also relates to the system as described above. Various embodiments and variants disclosed above apply mutatis mutandis to the system.

It will be appreciated that the plurality of apparatuses, their respective graphical user interfaces, user requests and requested actions are only used in plural corresponding to the aforementioned apparatus, the graphical user interface, the user request, and the requested action, respectively, of the first aspect. Herein the plurality of apparatuses may be collaborating using a same software application. Examples of such software applications include, but are not limited to, multi-player games, multi-user simulators, multi-user design softwares, multi-user text-editing softwares and the like.

The term "time interval" as used herein refers to the period of time in which the set of user requests, from amongst the received user requests are collected before they are processed to create respective instructions. Notably, the server is configured to process the set of user requests simultaneously. Moreover, the server is also configured to resolve the conflicts between the user requests of said set, so that there are no contradictions between the requested actions. It will be appreciated that the requested actions associated with the set of user requests are executed at different times, as they are instructed to be executed within the same time period, but starting from the different starting times at which the respective user requests were received at the plurality of apparatuses. Beneficially, the said execution allows the graphical user interfaces to be synchronised, as apparatuses experiencing minimal network delays are not at advantage as compared to other apparatuses experiencing large network delays.

For illustration purposes only, there will now be described an example in which a first user and a second user are collaborating together (via a first apparatus and a second apparatus, respectively) using a same software at the same time. A first network delay between the first apparatus and the server is higher than a second network delay between the second apparatus and the server. The apparatuses of the first user and the second user have their own timers, i.e., internal clocks over which respective user requests are received and timestamped.

At time t0=0 second and time t0'=0.1 second, respective user requests are received at the first apparatus and the second apparatus, respectively. The respective user requests are received at the server from the first apparatus and the second apparatus at time t2=0.5 second and time t2'=0.2 second, respectively. The server collects and processes the user requests to create respective instructions for the first apparatus and the second apparatus, wherein the respective instructions indicate to the first apparatus and the second apparatus to execute the respective requested actions within a given time period from time t0 and t0', respectively. As an example, the instructions to the first apparatus could be to execute the requested action at time t0+1.0 second, whereas the instructions to the second apparatus could be to execute the requested action at time t0'+1.0 second. In this way, the second user of the second apparatus is not at an advantage due to a shorter network delay as compared to the first user of the first apparatus. Moreover, in order to maintain a fluency in the user interfaces, intermediate actions are executed while waiting for the instructions from the server.

Optionally, the server is configured to determine the given time interval for which the server is to wait to collect the given set of user requests, based on the different network delays between the server and the individual apparatuses. In this regard, the server is also configured to determine the network delays between the server and the individual apparatuses. Furthermore, based on the network delays the time period for executing the intermediate actions may also change.

Optionally, the server is configured to adjust the given time interval based on fluctuations in the network delays. Thus, when the network delays are less, the given time interval can be adjusted to be short. As a result, the user requests are collected and processed without any perceivable delay for the users.

The present disclosure also relates to the computer-implemented method as described above. Various embodiments and variants disclosed above apply mutatis mutandis to the computer-implemented method.

Optionally, the requested action comprises relocating at least one user-controllable object from a given location to a target location on the graphical user interface, and the intermediate action comprises at least one of:

presenting a visual indicator on the graphical user interface to indicate that relocation of the at least one user-controllable object is under progress, showing movement of the at least one user-controllable object from the given location towards the target location on the graphical user interface.

Optionally, in some implementations, the method further comprises determining a speed at which the at least one user-controllable object is to be moved, based on a distance between the given location and the target location and optionally, at least one of: a network delay between the apparatus and the server, a processing delay at the server, a processing delay at the apparatus, wherein the step of executing the intermediate action comprises moving the at least one user-controllable object from the given location towards the target location at the determined speed.

Optionally, in this regard, the received instructions indicate a time period within which the at least one user-controllable object is to reach the target location, wherein the time period begins from start time (t0) at which the user request was received, and wherein the method comprises adjusting the speed based on the time period within which the at least one user-controllable object is to reach the target location and a distance between the target location and a current location of the at least one user-controllable object on the graphical user interface, wherein the step of executing the received instructions comprises moving the at least one user-controllable object towards the target location at the adjusted speed.

Optionally, in other implementations, the intermediate action comprises only presenting the visual indicator on the graphical user interface, and the received instructions indicate a time period within which the at least one user-controllable object is to reach the target location, wherein the time period begins from start time (t0) at which the user request was received, wherein the method comprises determining a speed at which the at least one user-controllable object is to be moved, based on a distance between the given location and the target location and the time period within which the at least one user-controllable object is to reach the target location, wherein the step of executing the received instructions comprises moving the at least one user-controllable object from the given location towards the target location at the determined speed.

Moreover, optionally, the method comprises determining a time period for which the intermediate action is to be executed, based on at least one of: a network delay between the apparatus and the server, a processing delay at the server, a processing delay at the apparatus, wherein the execution of the intermediate action is terminated after completion of the determined time period.

Optionally, the execution of the intermediate action is terminated upon at least one of:

receipt of the instructions pertaining to the user request, processing of the instructions pertaining to the user request, said processing being performed prior to execution of the instructions.

Optionally, the method further comprises timestamping the user request.

Optionally, the method further comprises:

receiving, from a plurality of apparatuses at the server, respective user requests to execute respective requested actions on respective graphical user interfaces, wherein the plurality of apparatuses are collaborating via the respective graphical user interfaces;

collecting at the server a given set of user requests, from amongst the received user requests, that have been received during a given time interval;

processing the given set of user requests at the server to create respective instructions pertaining to the user requests of the given set, wherein the step of processing the given set of user requests comprises determining, based on different network delays between the server and individual apparatuses, a time period within which the respective requested actions are to be executed, and wherein the respective instructions indicate to the individual apparatuses the determined time period within which the respective requested actions are to be executed; and sending the respective instructions pertaining to the user requests of the given set from the server to the plurality of apparatuses.

The present disclosure also relates to the computer program product as described above. Various embodiments and variants disclosed above apply mutatis mutandis to the computer program product.

Optionally, the computer program product is implemented as an algorithm, embedded in a software stored in the non-transitory computer-readable storage medium. The non-transitory computer-readable storage medium may include, but is not limited to, an electronic storage device, a magnetic storage device, an optical storage device, an electromagnetic storage device, a semiconductor storage device, or any suitable combination of the foregoing. Examples of implementation of computer-readable storage medium, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

DETAILED DESCRIPTION OF THE DRAWINGS

Referring to FIG. 1, illustrated is an apparatus 100 for rendering a graphical user interface 102, in accordance with an embodiment of the present disclosure. As shown, the graphical user interface 102 is rendered on a display screen 104 of the apparatus 100. The graphical user interface 102 presents objects 106 and at least one user-controllable object 108. The user may control the movement of the user-controllable object 108 on the graphical user interface 102 of the apparatus 100. As an example, a user request to move the user-controllable object 108 can be provided on the graphical user interface by providing a tap at a target location 110 on the graphical user interface 102. As an implementation, the user request is communicated to a server via a processor 112 of the apparatus 100, wherein the user request is verified by the server and instructions to move are provided back to the apparatus 100. In this regard, the instructions are executed by the processor 112 of the apparatus 100 and the user-controllable object 108 is moved from a given position 114 to the position of the tap (herein the target location 110).

Figure 2:
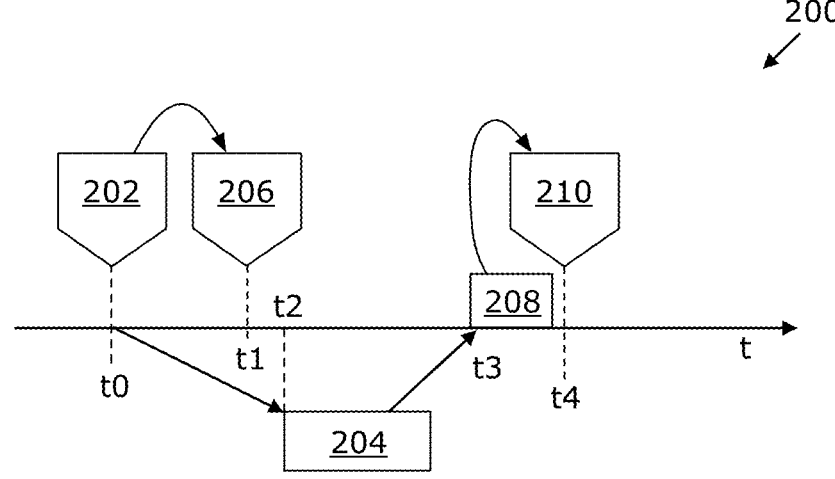
FIG. 2 is a schematic illustration of a timeline associated with processing of the user request, in accordance with an embodiment of the present disclosure.

Referring to FIG. 2, illustrated is a timeline 200 associated with processing of a user request 202, in accordance with an embodiment of the present disclosure. As shown, a user controlling a user interface provides a user request 202 at time t0 to perform a requested action. The user request 202 is communicated to a server 204. The user request 202 is received by the server 204 at time t2. The user request 202 given at time t0 triggers an intermediate action 206. The intermediate action 206 is started at time t1 shortly after time t0, but before time t2.

The instructions 208 are received from the server at time t3. Moreover, the intermediate action 206 can be executed until the instructions are received or processed by the processor of the apparatus. Furthermore, the instructions 208 are executed to perform the requested action 210 at time t4.

Figure 3:
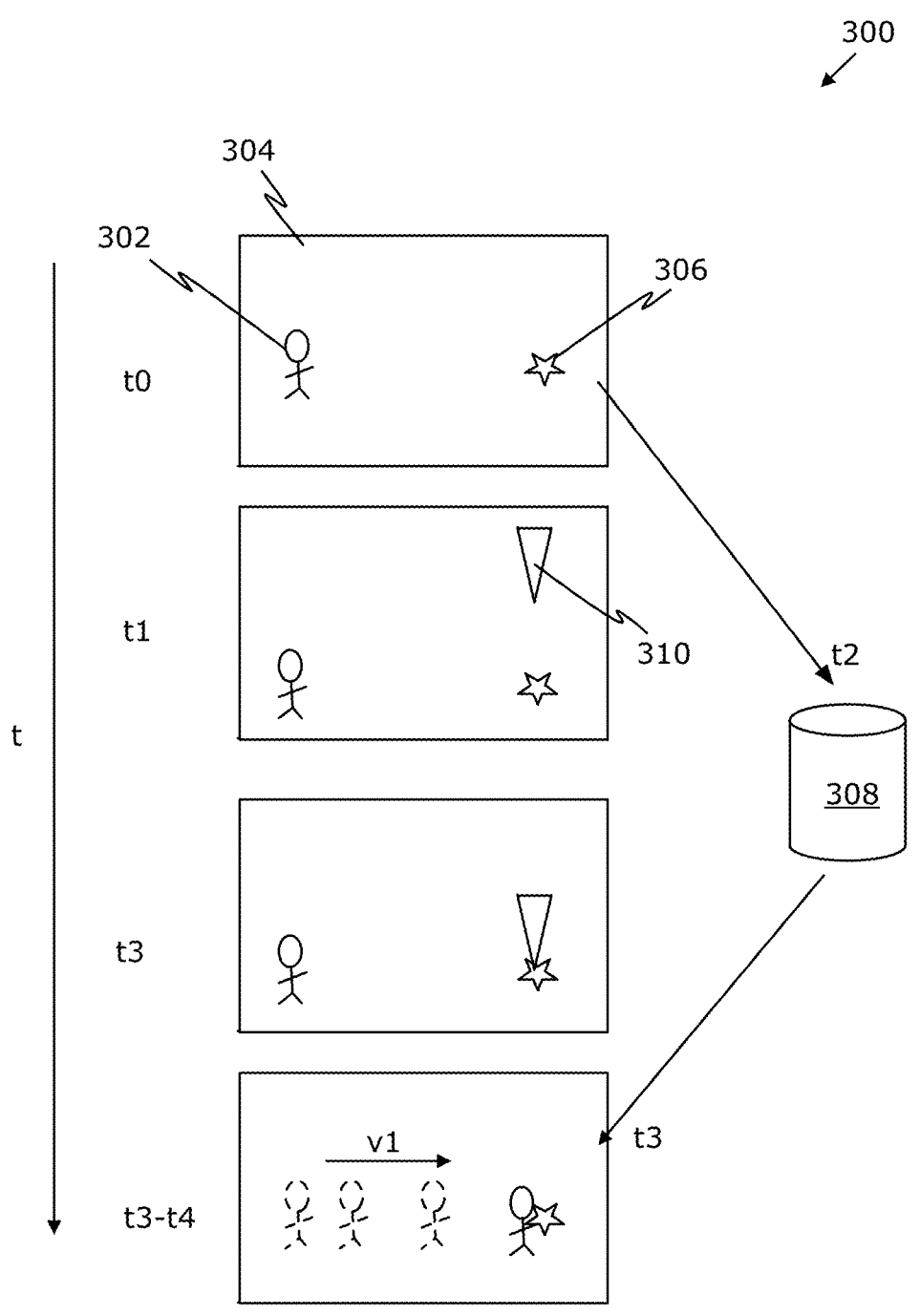
FIG. 3 is a schematic illustration of steps depicting the movement of a user-controllable object on a graphical user interface, in accordance with an embodiment of the present disclosure.

Referring to FIG. 3, illustrated is a schematic illustration of steps 300 depicting the movement of a user-controllable object 302 in a graphical user interface 304, in accordance with an embodiment of the present disclosure. As shown, the moment of times are depicted as t0, t1, t2, t3 and t4. At time t0, a user request to move a user-controllable object 302 to a target location 306 is received. At time t2, the user request is received by the server 308. At time t1, an intermediate action is executed using a processor of the apparatus. The intermediate action is rendered by moving a visual indicator 310 in the graphical user interface 304 of the apparatus. As shown, the visual indicator 310 is an arrow which drops from upper part of the graphical user interface 304 towards the target location 306. Optionally, the visual indicator 310 is configured to touch ground at time t3, i.e., on the same time an instruction based on the requested action in the server 308 is received by the processor. During the time period t3-t4 the user-controllable object 302 moves (indicated with dashed line) with speed v1 to the target location 306.

Figure 4A:
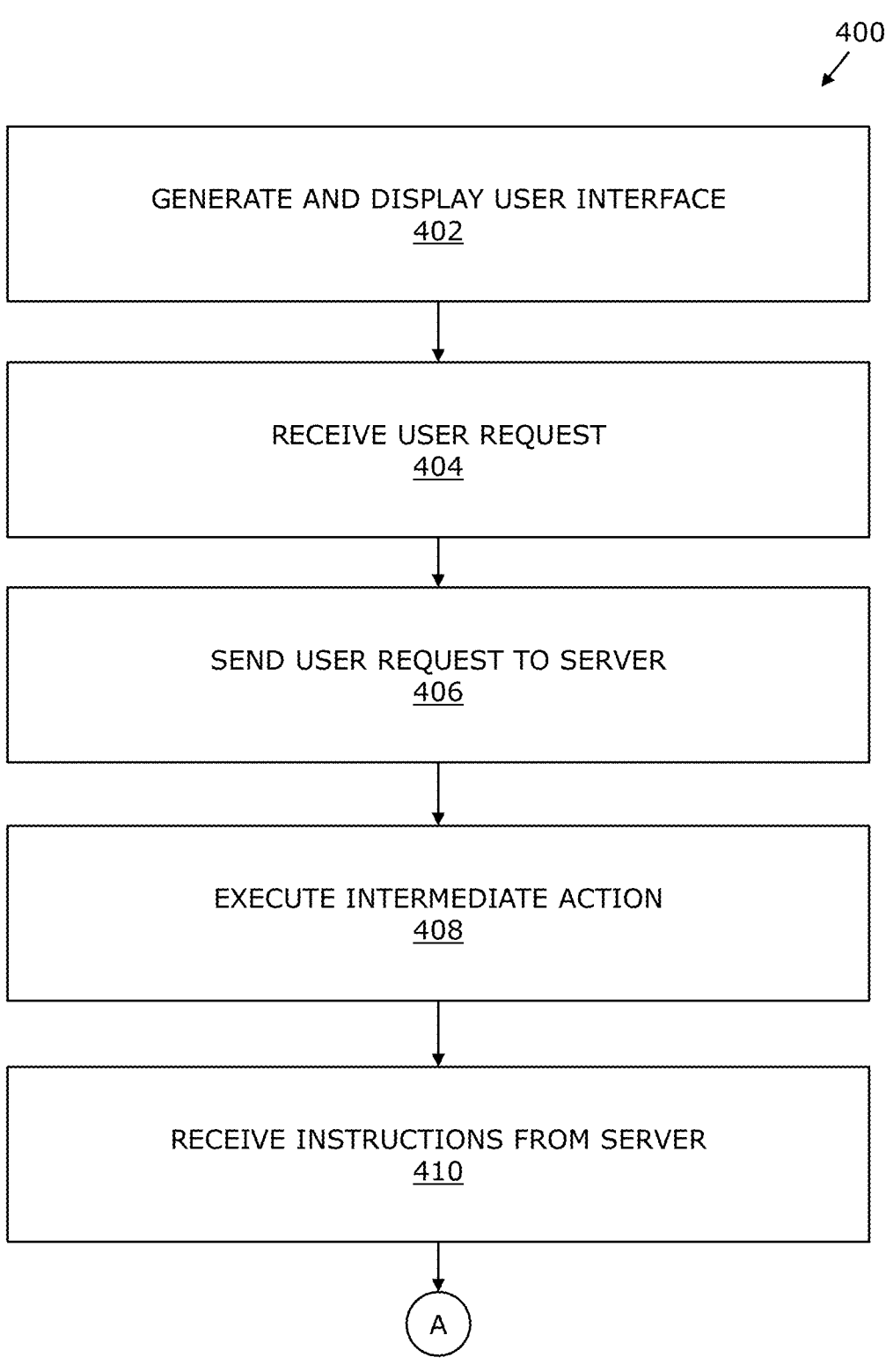
FIGS. 4A and 4B collectively are a flowchart depicting steps of a computer-implemented method for synchronising actions, in accordance with an embodiment of the present disclosure.
Figure 4B:
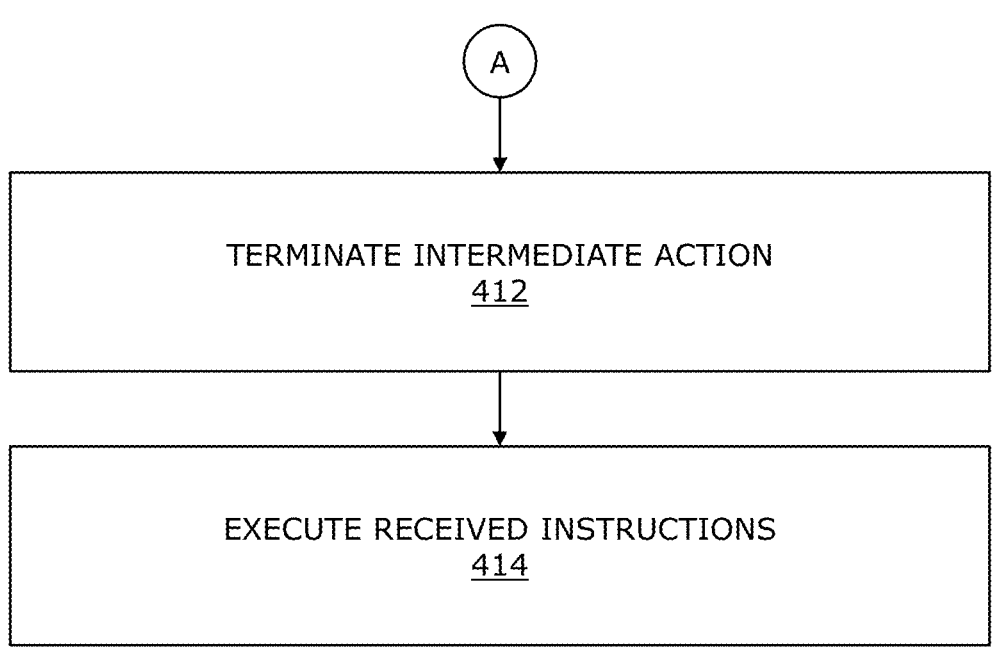

Referring to FIGS. 4A and 4B, illustrated is a flowchart 400 of steps of a computer-implemented method, in accordance with an embodiment of the present disclosure. At step 402, a graphical user interface is generated and displayed on a display screen of an apparatus. At step 404, a user request is received to execute a requested action on the graphical user interface. At step 406, the user request is sent to a server. At step 408, an intermediate action is executed on the graphical user interface, whilst waiting for the server to create and provide instructions pertaining to the user request. At step 410, the instructions pertaining to the user request is received from the server. At step 412, execution of the intermediate action is terminated. At step 414, the received instructions pertaining to the user request is executed on the graphical user interface.

The steps 402, 404, 406, 408, 410, 412 and 414 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:
1. An apparatus comprising:
a graphical user interface; and
a processor configured to:

send a received user request to execute a requested action on the graphical user interface to a server, the requested action being a request to move a user-controllable object on the user interface from a given location to a target location, and wherein the server is configured to create and provide instructions pertaining to the user request;

execute, immediately after receiving the user request and prior to receiving instructions from the server, an intermediate action on the graphical user interface, the intermediate action comprising a movement of the user-controlled object on the graphical user interface toward the target location at a first speed, the movement being locally executed while awaiting server instructions;

wherein the server is configured to determine if the received user request is allowable; and if the server determines that the received user request is allowable, the server is configured to send the instructions to execute the user request to the processor; and if the server determines that the received user request is not allowable, the server is configured to indicate that the requested action is not allowable and terminate the intermediate action to cause the user-controlled object to return to a position on the graphical user interface corresponding to a position at a time of receiving the user request.

2. The apparatus according to claim 1, wherein the processor is configured to send, with the received user request, a timestamp of a time at which the user request was received, the time stamp being used by the server to calculate a time period within which the user request is to be executed, wherein the provided instructions indicate an end time of the requested action based on the received timestamp.

3. The apparatus according to claim 2, the processor being configured to receive the instructions pertaining to the user request from the server; and
terminate execution of the intermediate action prior to execution of the received instructions.

4. The apparatus according to claim 3, wherein the processor is configured to execute the received instructions pertaining to the user request on the graphical user interface by increasing or decreasing the first speed to a second speed to complete the movement of the user-controllable object to the target location by the indicated time period.

5. The apparatus according to claim 4, wherein a determination by the processor to increase or decrease the first speed to the second speed is based on a distance between the user-controllable object and the target location on the graphical user interference and the network delay between the apparatus and the server.

6. The apparatus of claim 1, wherein the intermediate action further comprises at least one of:
presenting a visual indicator on the graphical user interface to indicate that relocation of the at least one user-controllable object is under progress,
showing movement of the at least one user-controllable object from the given location towards the target location on the graphical user interface.

7. The apparatus of claim 1, wherein the execution of the intermediate action is terminated upon at least one of:
receipt of the instructions from the server pertaining to the user, or,

processing of the received instructions pertaining to the
user request, the processing being performed prior to
execution of the instructions.

8. The apparatus according to claim 1, wherein the
processor is configured to determine a time period for
execution of the intermediate action based on a determined
network delay between the process and the server and a
processing delay of the server, the time period being smaller
than a time required for the user-controlled object to reach
the target location and terminate execution of the interme-
diate action at the end of the determined time period.

9. A system comprising a server communicably coupled
to a plurality of apparatuses, wherein an apparatus of the
plurality of apparatuses comprises a graphical user interface
and a processor configured to:

send a received user request to execute a requested action
on the graphical user interface to the server, the
requested action being a request to move a user-
controllable object on the user interface from a given
location to a target location, and wherein the server is
configured to create and provide instructions pertaining
to the user request;

execute, immediately after receiving the user request and
prior to receiving instructions from the server, an
intermediate action on the graphical user interface, the
intermediate action comprising a movement of the user-
controlled object on the graphical user interface toward
the target location at a first speed, the movement being
locally executed while awaiting server instructions;

wherein the server is configured to determine if the
received user request is allowable; and if the server determines that the received user request is
allowable, the server is configured to send the instruc-
tions to execute the user request to the processor; and if the server determines that the received user request is
not allowable, the server is configured to indicate that
the requested action is not allowable and terminate the
intermediate action to cause the user-controlled object
to return to a position on the graphical user interface
corresponding to a position at a time of receiving the
user request.

10. The system according to claim 9, wherein the pro-
cessor is configured to send, with the received user request,
a timestamp of a time at which the user request was received,
the time stamp being used by the server to calculate a time
period within which the user request is to be executed,
wherein the provided instructions indicate an end time of the
requested action based on the received timestamp.

11. The system according to claim 10, the processor being
configured to receive the instructions pertaining to the user
request from the server; and terminate execution of the intermediate action prior to
execution of the received instructions.

12. The system according to claim 11, wherein the pro-
cessor is configured to execute the received instructions
pertaining to the user request on the graphical user interface
by increasing or decreasing the first speed to a second speed
to complete the movement of the user-controllable object to
the target location by the indicated time period.

13. The system according to claim 12, wherein a deter-
mination by the processor to increase or decrease the first
speed to the second speed is based on a distance between the
user-controllable object and the target location on the
graphical user interference and the network delay between
the apparatus and the server.

14. The system of claim 9, wherein the intermediate
action further comprises at least one of:

presenting a visual indicator on the graphical user inter-
face to indicate that relocation of the at least one
user-controllable object is under progress, showing movement of the at least one user-controllable
object from the given location towards the target loca-
tion on the graphical user interface.

15. The system of claim 9, wherein the execution of the
intermediate action is terminated upon at least one of:

receipt of the instructions from the server pertaining to the
user, or, processing of the received instructions pertaining to the
user request, the processing being performed prior to
execution of the instructions.

16. The system according to claim 9, wherein the pro-
cessor is configured to determine a time period for execution
of the intermediate action based on a determined network
delay between the process and the server and a processing
delay of the server, the time period being smaller than a time
required for the user-controlled object to reach the target
location and terminate execution of the intermediate action
at the end of the determined time period.

17. A computer-implemented method comprising:

sending a received user request to execute a requested
action on the graphical user interface to a server, the
requested action being a request to move a user-
controllable object on the user interface from a given
location to a target location, and wherein the server is
configured to create and provide instructions pertaining
to the user request;

executing, immediately after receiving the user request
and prior to receiving instructions from the server, an
intermediate action on the graphical user interface, the
intermediate action comprising a movement of the
user-controlled object on the graphical user interface
toward the target location at a first speed, the movement
being locally executed while awaiting server instruc-
tions;

wherein the server is configured to determine if the
received user request is allowable; and if the server determines that the received user request is
allowable, the server is configured to send the instruc-
tions to execute the user request to the processor; and if the server determines that the received user request is
not allowable, the server is configured to indicate that
the requested action is not allowable and terminate the
intermediate action to cause the user-controlled object
to return to a position on the graphical user interface
corresponding to a position at a time of receiving the
user request.

18. The computer implemented method according to
claim 17, further comprising, sending to the server, with the
received user request, a timestamp of a time at which the
user request was received, the time stamp being used by the
server to calculate a time period within which the user
request is to be executed, wherein the provided instructions
indicate an end time of the requested action based on the
received timestamp.

19. The computer implemented method according to
claim 17, further comprising determining a time period for
execution of the intermediate action based on a determined
network delay between the process and the server and a
processing delay of the server, the time period being smaller
than a time required for the user-controlled object to reach
the target location and terminate execution of the interme-
diate action at the end of the determined time period.

20. A computer program product comprising a non-
transitory computer-readable storage medium having computer-readable instructions stored thereon, the computer-readable instructions being executable by a computing device comprising a processor to execute the computer implemented method as claimed in claim 17.

\* \* \* \* \*